United States Patent
Wugofski

(10) Patent No.: US 6,346,934 B1
(45) Date of Patent: Feb. 12, 2002

(54) PROGRAMMABLE REMOTE DEVICE CONTROL APPARATUS AND METHOD

(75) Inventor: Theodore D. Wugofski, Fort Worth, TX (US)

(73) Assignee: Gateway, Inc., North Sioux City, SD (US)

( * ) Notice: Subject to any disclaimer, the term of this patent is extended or adjusted under 35 U.S.C. 154(b) by 0 days.

(21) Appl. No.: 09/312,970

(22) Filed: May 17, 1999

(51) Int. Cl.$^7$ ................................................ G09G 5/08
(52) U.S. Cl. ........................................ 345/158; 348/734
(58) Field of Search ................................ 345/156–158, 345/169, 172, 168; 348/734, 552; 341/20, 22; 340/825.69, 825.72

(56) References Cited

U.S. PATENT DOCUMENTS

| | | | |
|---|---|---|---|
| 5,109,482 A | 4/1992 | Bohrman | 395/154 |
| 5,202,961 A | 4/1993 | Mills et al. | 395/159 |
| 5,204,768 A * | 4/1993 | Tsakiris et al. | |
| 5,410,326 A * | 4/1995 | Goldstein | |
| 5,450,079 A * | 9/1995 | Dunaway | 345/169 |
| 5,475,835 A | 12/1995 | Hickey | 395/600 |
| 5,627,978 A | 5/1997 | Altom et al. | 395/330 |
| 5,673,401 A | 9/1997 | Volk et al. | 395/327 |
| 5,675,753 A | 10/1997 | Hansen et al. | 395/333 |
| 5,692,205 A | 11/1997 | Berry et al. | 395/788 |
| 5,694,562 A | 12/1997 | Fisher | 395/349 |
| 5,724,106 A * | 3/1998 | Autry et al. | 348/734 |
| 5,819,156 A * | 10/1998 | Belmont | 348/552 |
| 6,005,490 A * | 12/1999 | Higashihara | 348/734 |
| 6,047,121 A * | 4/2000 | Vaughan | |

* cited by examiner

*Primary Examiner*—Regina Liang
(74) *Attorney, Agent, or Firm*—Schwegman, Lundberg, Woessner & Kluth, P.A.

(57) ABSTRACT

The present apparatus and method provides a programmable remote control having a definable and redefinable user interface for control of multiple applications or applets loaded on a computer. The user interface of the remote control may be controlled by assigning specific functionality to events or commands issued by a user using the remote control. The events or commands are delivered to the computer and to the specific applications or applets which have registered to receive that specific command or event.

25 Claims, 2 Drawing Sheets

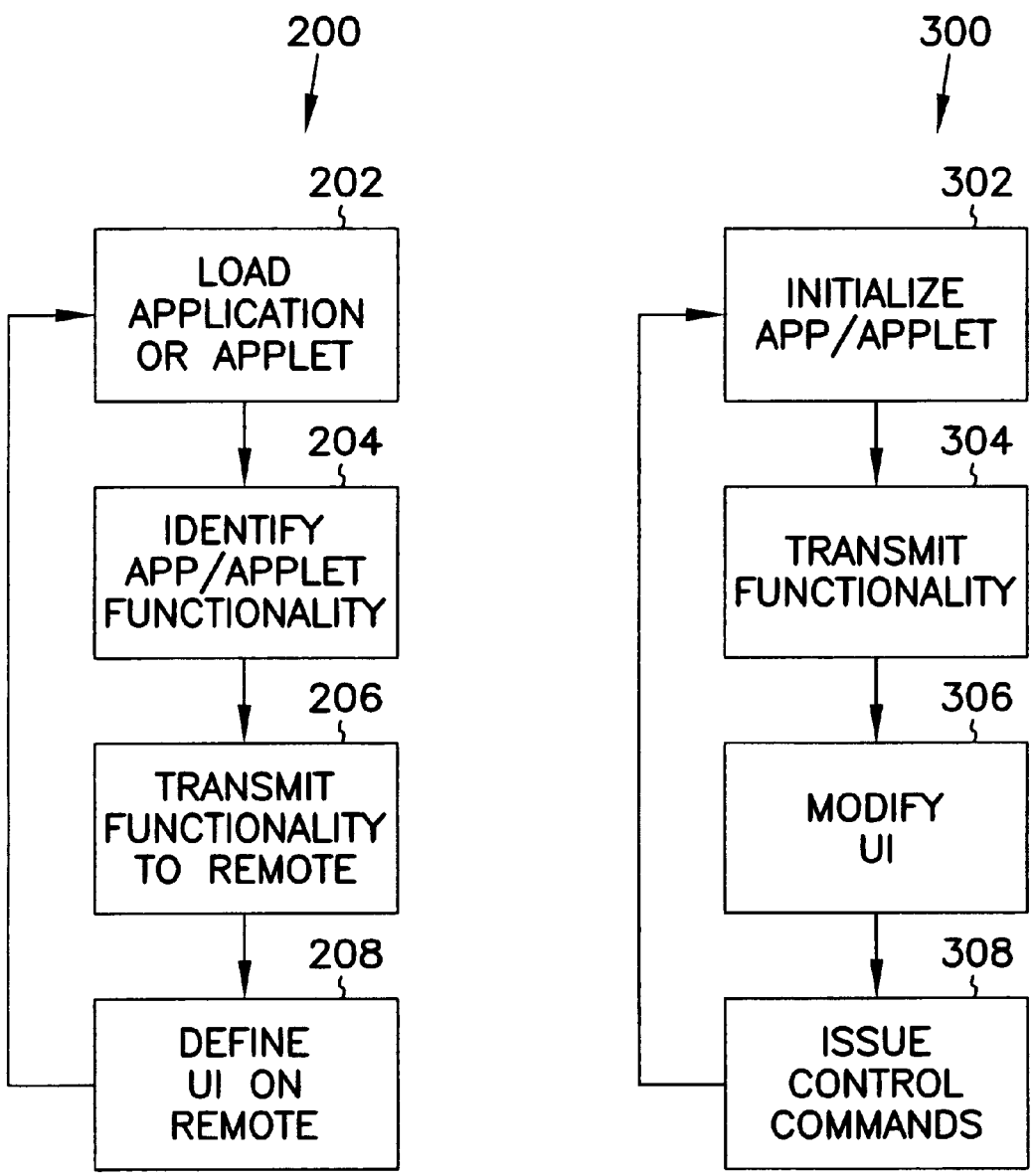

PROGRAMMABLE REMOTE DEVICE CONTROL APPARATUS AND METHOD

FIELD OF THE INVENTION

The present invention pertains to user interfaces for multimedia entertainment and computing systems, particularly to remote control devices and methods for remotely controlling applications and the interfaces.

BACKGROUND OF THE INVENTION

The home electronics industry, in the midst of an on-going convergence of televisions and computers, has produced a new class of products, known as PC-TV systems, or personal-computer-television systems. In their simplest form, these systems allow users to selectively switch between using a video monitor, or display, to watch television or to support computer activities, like word processing, creating spread sheets, playing computer games, or even surfing the world wide web. A seminal example, the Gateway Destination PC-TV system, from Gateway 2000, Inc., not only weds a television to a personal computer, but allows system expansion to include video-cassette recorders, laser-disc players, video cameras, direct-broadcast-satellite receivers, and so forth.

Another feature of systems such as the Gateway Destination system is the use of a remote control, or wireless keyboard, placed some distance from the computer, so that users may participate in home entertainment as a family, instead of individually. Due to the number of components capable of being connected in such a system, control of the various components can become tedious. A graphical user interface displayed on the computer screen may allow individual control of the components of the system.

A number of application programs for communication and navigation on the internet and world wide web are in common use, such as Netscape Navigator and Microsoft Internet Explorer. These programs or browsers communicate with remote computer systems via the internet or other computer network. When executed, the browser software causes the computer to operate a network communication device such as a modem. When browsing the world wide web, a user navigates to different environments, known as web pages. On these web pages, any number of features may be present, including applets.

An applet is a small application that is often present on world wide web sites. Applets are typically also shipped with an operating or a larger product, such as the calculator that comes with Windows. Applets on world wide web sites are often written in a programming language known as Java. Java is a platform-independent programming language. Java programs are commonly referred to as applets since they are most often used for small, transportable programs.

Applets are commonly loaded into a web browser when a user is navigating web pages. The applets may modify their own user interfaces. Applications taking the form of software stored on the hard drive of a computer also have graphical user interfaces for control of the applications. These user interfaces are modifiable by the user and by the program as well. Each application or applet has its own individual user interface.

Programmable remote controls for operating the user interface of an application or applet require the user to specify which functions of the user interface of an application or applet are allocated to specific buttons on the remote control. When a new application or applet is loaded, in order to allow the remote control to function as a remote for the new application or applet, the remote control must be manually reprogrammed to control the functions of the new application or applet.

Applications and applets may modify their own user interfaces. However, each application or applet has its own functionality setup, and each application or applet generally has its own specific user interface.

Accordingly, it would be desirable to provide a remote control with increased functionality for different applications and applets.

It would also be desirable to provide a graphical user interface having increased capability.

SUMMARY OF THE INVENTION

The present invention overcomes the problems of the prior art by providing a method and apparatus for programming a remote control for multi-application or applet functionality, in which the user interface may be defined and redefined by the applications or applets.

A remote control unit embodiment of the present invention comprises a programmable remote control device having a transceiver for receiving and transmitting information, and a graphical user interface on the programmable remote control. The graphical user interface is responsively defined by an application or applet by receiving functionality information from the application via the transceiver.

In another embodiment of the present invention a remote control system for a computer comprises a programmable remote control having a transceiver for receiving and transmitting information from and to the computer, and a graphical user interface on the remote control. The graphical user interface controls an application loaded on the computer, and is redefinable to control a second application loaded on the computer responsive to the loading of the second application on the computer.

A controller embodiment of the present invention comprises at least one key responsive to the execution or activation of a first one of the computer-related applications or applets to provide a first control function and responsive to the execution or activation of a second one of the computer-related applications or applets to provide a second control function.

In yet another embodiment, the present invention comprises a computer system having a computer with a processor capable of executing a computer application or applet, a first graphical user interface for interfacing with the application or applet, and a controller having a second graphical user interface to display a set of controls for the application or applet. The second graphical user interface is responsive to a user activating or interfacing with the application or applet, and is also responsive to the user activating or interfacing with a second application or applet to redefine the second GUI to display a second set of controls for the second application.

A method embodiment for programming a remote control device for operation of a computer system comprises loading an application or applet on the computer, identifying the functionality of the application or applet, transmitting the identified functionality of the application or applet to a remote control, and defining a user interface on the remote control in response to the transmitted functionality. This user interface on the remote control may be redefined or modified when another application or applet is loaded on the computer.

Other embodiments and advantages of the invention will become apparent after considering the accompanying drawings and the following detailed description.

BRIEF DESCRIPTION OF THE DRAWINGS

FIG. 2 is a flowchart block diagram of a method embodiment of the present invention;and FIG. 3 is a flowchart block diagram of another method embodiment of the present invention.

Detailed Description of the Preferred Embodiment

Figure 1:
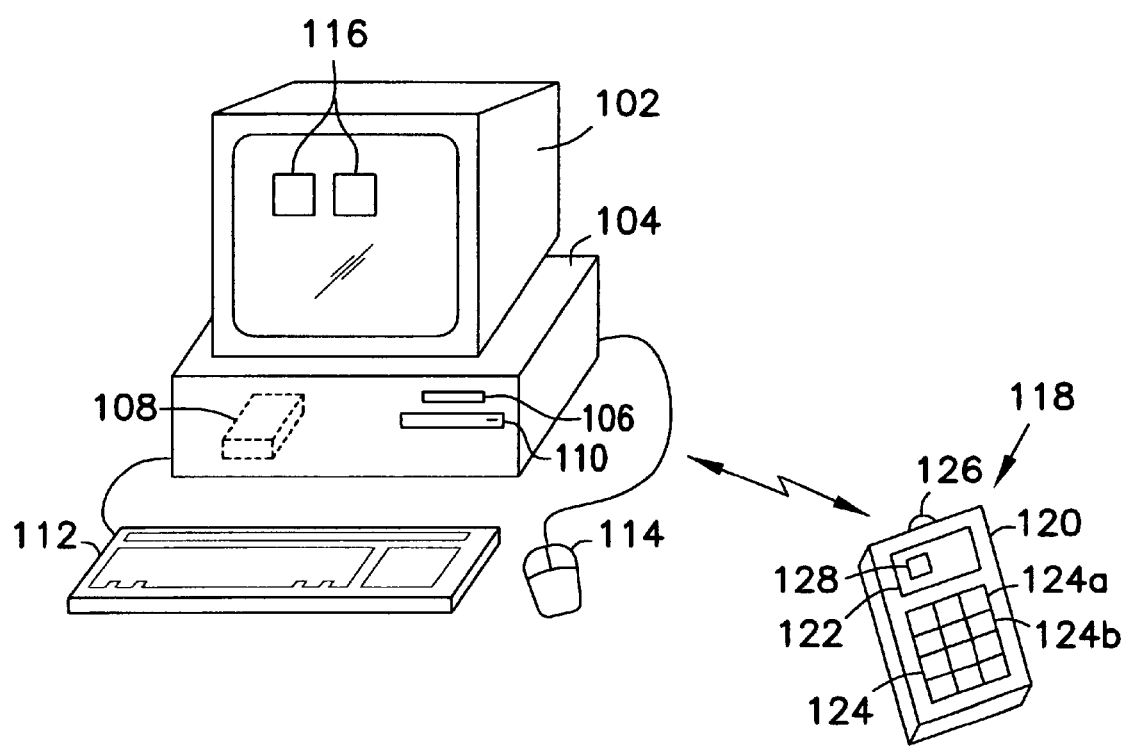
FIG. 1 is a perspective diagram of a computer system embodiment of the present invention.

In the following detailed description of the embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

The following detailed description, which references and incorporates FIGS. 1–3, describes and illustrates various embodiments of the invention. FIG. 1 shows a PC-TV (or convergence) system 100, which may incorporate features of the Destination PC-TV system from Gateway 2000, Inc. of North Sioux City, S. Dak., and includes a monitor 102, and a computer 104. Monitor 102, the heart of the system from a user perspective, displays video programming from computer 104. Further components of a typical computer system may include a machine readable storage media such as disk drive 106, mass data storage 108 such as a hard disk, CD-ROM 110, DVD, modem, and the like. Computer or information system 100 also typically includes a set of user interface devices including, for example, a keyboard 112 and a mouse or other pointing device 114 all of which support user interaction with at least one graphical user interface 116 or operating system, such as a version of Microsoft Windows. The processor unit of such a computer typically includes a microprocessor, memory (RAM and ROM), and other peripheral circuitry, not shown.

While a computer system has been described, such a system may also include or substitute a set-top box or the like as an information system, the information system having the functionality of a processor capable of executing a computer application or applet, or the like. Further, as used herein, information system or computer describes devices including but not limited to desktop computers, laptop computers, hand-held computers, set-top boxes, computer systems, and the like.

A remote control system 118 is also shown in FIG. 1, and comprises a remote control unit 120 having a display 122, a plurality of buttons 124, and a means for transmitting and receiving information, such as a transceiver 126, and a user interface 128 on the remote control display 122. Transceiver 126 of remote control unit 120 is used for receiving information from and transmitting information to computer 104. Such transmission may also be accomplished using wireless technology as is known in the art.

Other configurations of connection of the remote control unit to the computer, including by conventional cabling, are within the scope of the invention. One skilled in the art will readily recognize numerous other suitable configurations for transferring the information to and from the computer and the remote control unit. For example, but not by way of limitation, transfer may be made over optical cables, or by other wireless communication including radio frequencies, infrared, and the like. Such modifications are well within the expertise of one skilled in the art, and will not be discussed further herein.

The graphical user interface 116 on computer monitor 102 is responsively defined by an application or applet, and the user interface of the remote control unit 120 is defined by receiving functionality information from the application via the transceiver. Buttons 124 on the remote control unit 120 are given specific functions according to the application or applet As the user navigates to different web pages, or to different applications, each successive application or applet, the user interface 128, including various buttons 124, on the remote control unit 120, are redefined.

The user interface 128, operable by buttons on the remote control unit 120, sends commands, or events, to the computer 104, and through the processor and memory of the computer 104 controls an application loaded on the computer. Operation of the user interface 128 controls commands to the application or applet. When an application or applet is loaded or initialized, it sends information regarding functionality and features of the application or applet to the remote control system 118. Appropriate transmission capabilities of the computer 104 will enable the computer 104 to send the functionality information pertaining to the application or applet to the remote control system 118 via the transceiver 126. The user interface 128 of the remote control unit 120 is redefinable to control a second application when a second application or applet is loaded on the computer. As additional applications or applets are added to the user interface 128, the user interface 128 is redefined to take into account the new functionality and features of the added applications or applets. This process is called registration.

Each new application or applet registers with user interface 128 of remote control system 118. Further, each command or functionality of the new application or applet is integrated into the user interface 128. Some user triggered events will control more than one application or applet, as certain functions and features may be present in more than one application. When an event is triggered at the remote control unit 120 by the user, the command or event is sent by the remote control system 118 to all applications or applets which have registered for the specific command or event. If an application or applet has not registered for the event or command issued by the user through user interface 128, that application or applet does not receive the event or command.

For example, suppose a television applet is loaded into the computer 104. The television applet triggers the adding of its functionality to the user interface 128 of remote control system 118. The television is added to the device buttons 124 of remote control unit 120. The functionality of the television is added to the dynamic user interface 128, and is combined with other application and applet functionality controlled through use of the remote control unit 120 user interface 128. When the user desires to actuate television commands, the appropriate buttons of buttons 124 are pressed or actuated on remote control unit 120, causing a television command or event to be sent to the graphical user interface 116.

Another embodiment of the present invention comprises at least one specific button key 124*a* specifically responsive to the execution or activation of a first one of the computer-related applications or applets to provide a first control function and a second specific button key 124*b* responsive to the execution or activation of a second one of the computer-related applications or applets to provide a second control function. Buttons 124 on remote control unit 120 may be specifically assigned to functions or to specific applications or applets. The buttons or keys 124 may be hardkeys, in which a specific key is assigned to a specific function, or softkeys, in which a button or key 124 is assigned to different functionalities within the context of the GUI.

A method embodiment 200 for programming a remote control device for operation of a computer system is shown in FIG. 2, and comprises loading an application or applet on the computer in block 202, identifying the functionality of the application or applet in block 204, transmitting the identified functionality of the application or applet to a remote control in block 206, and defining a user interface on the remote control in response to the transmitted functionality in block 208. As each new application or applet is loaded, the method 200 further comprises repeating blocks 202 through 208 to redefine the user interface of the remote control unit.

A method 300 of operating a computer system having a programmable remote control is shown in FIG. 3. Method 300 comprises initializing an application or applet in block 302, transmitting the functionality of the application or applet to a programmable remote control in block 304, modifying the user interface of the remote control in block 306, and issuing commands for control of the graphical user interface of the computer in block 308. The user interface of the remote control may be remodified by a new application or applet by following the same method 300. If multiple applications or applets are to be encompassed by the user interface of the remote control, the remote control interface is dynamically changed to consolidate like functions with like functions of different applications or applets.

The user interface of the remote control is context sensitive when the user is operating the remote control unit to control the functionality of the first application. The application running on the computer system, set-top box, or the like, is controlled by input on the remote control unit by the user. The various functionalities of the application or applet are embodied in the GUI of the remote control unit.

Also, the GUI on the remote control unit may be swapped with or replaced by a second or further GUI to control the functionality of a second or further application loaded onto the computer system. When a new application or applet is loaded into the computer system, the remote control and the system embodiments of the present invention allow for the GUI to dynamically change to accommodate the new application. Alternatively, the GUI of the remote control unit may adapt to control functionality of multiple applications or applets within the context of the GUI.

Methods 200 and 300 and apparatuses 100 and 118 may be embodied by a machine readable medium comprising machine readable instructions for carrying out the methods or implementing the functionality of the apparatus. The computer programs run on the central processing unit 104 out of main memory, and may be transferred to main memory from permanent storage via disk drive 108 when stored on removable media or via a network connection or modem connection when stored outside of the personal computer, or via other types of computer or machine readable medium from which it can be read and utilized. The computer programs comprise multiple modules or objects to perform the methods 200 and 300, or the functions of the modules in apparatuses 100 or 118. The type of computer programming languages used to write the code may vary between procedural code type languages to object oriented languages. The files or objects need not have a one to one correspondence to the modules or method steps described depending on the desires of the programmer. Further, the method and apparatus may comprise combinations of software, hardware and firmware as is well known to those skilled in the art.

It should be understood that application of the present invention may be made to many different computer formats and platforms, as well as many different computer configurations. Such configurations include by way of example, but not by way of limitation, PC-TV, personal computer, portable computers, WebTV, home theater, home entertainment, and other computer based platforms.

CONCLUSION

The present apparatus and method provide a dynamically redefinable remote control system for control and modification of a user interface to control functions and features of one or more computer applications or applets. As the user navigates between world wide web sites containing applets, and applications of the computer system, the user interface of a remote control and the graphical user interface of the computer may be controlled. The user interface can be defined and redefined as the user moves between different application and applet contexts. When the user operates on the user interface of the remote control, events or commands are dispatched or transmitted to the specific applications or applets that have registered with the user interface.

The embodiments described above are intended only to illustrate and teach one or more ways of practicing or implementing the present invention, not to restrict its breadth or scope. The actual scope of the invention, which encompasses all ways of practicing or implementing the invention, is defined only by the following claims and their equivalents.

What is claimed is:

1. An information system, comprising:
   a computer having a processor capable of executing a computer application or applet; and
   a controller having a user interface to display a set of controls for the application or applet, the user interface responsive to a user activating or interfacing with the application or applet, and responsive to the user activating or interfacing with a second application or applet to redefine the user interface to display a second set of controls for the second application.

2. The information system of claim 1, wherein the controller is a remote controller.

3. The information system of claim 2, and further comprising:
   means within the computer for transmitting the functionality of an application or applet to the remote control unit.

4. The information system of claim 3, wherein the means for transmitting is a transceiver.

5. The information system of claim 2, and further comprising:
   means within the remote control unit for receiving the functionality of an application or applet from the computer.

6. The information system of claim 5, wherein the means for receiving is a transceiver.

7. The information system of claim 1, wherein the remote controller communicates with the computer via a wireless communication link.

8. The information system of claim 1, wherein the controller includes a pointing device for activating or interfacing with the first application or applet.

9. The information system of claim 1, and further comprising:
a first transceiver coupled to the processor; and
a second transceiver coupled to the controller.

10. An object-adaptive remote control unit adapted to control applications and applets on a computer, the remote control unit comprising:
a programmable remote control device having means for receiving and transmitting information;
a user interface on the programmable remote control, the user interface responsively defined by an application or applet by receiving functionality information from the application via the transceiver.

11. The remote control unit of claim 10, wherein the user interface is reconfigurable by another application or applet.

12. The remote control unit of claim 10, wherein the means for receiving and transmitting is a transceiver.

13. The remote control unit of claim 10, wherein the means for receiving and transmitting is a wireless communication link.

14. A context-sensitive remote control system for a computer, comprising:
a programmable remote control having a transceiver for receiving and transmitting information from and to the computer; and
a user interface on the remote control, the UI controlling an application loaded on the computer, and redefinable to control a second application loaded on the computer responsive to the loading of the second application on the computer.

15. A controller for a computer system capable of executing a plurality of different computer-related applications or applets, the controller comprising:
at least one key responsive to the execution or activation of a first one of the computer-related applications or applets to provide a first control function and responsive to the execution or activation of a second one of the computer-related applications or applets to provide a second control function.

16. The controller of claim 15, wherein the first control function concerns a function of the first one of the computer-related applications or applets and the second control function concerns a function of the second one of the computer-related applications.

17. The controller of claim 15, further including a wireless transceiver which is coupled to the one key and which detects the execution or activation of at least the first and second computer-related applications.

18. The controller of claim 17 wherein the one key is a softkey.

19. The controller of claim 17 wherein the one key is a hardkey.

20. The controller of claim 17 wherein the one key is a softkey on a remote graphical user interface.

21. A method of programming a hand held device for operation of a computer system, comprising:
loading an application or applet on the computer;
identifying the functionality of the application or applet;
transmitting the identified functionality of the application or applet to a remote control; and
defining a user interface on the remote control in response to the transmitted functionality.

22. The method of claim 21, and further comprising:
redefining the user interface on the remote control in response to the loading of a new application or applet.

23. The method of claim 21, and further comprising:
controlling the functionality of the application or applet using the remote control.

24. A machine readable medium comprising machine readable instructions for causing a computer to perform a method comprising:
loading an application or applet on the computer;
identifying the functionality of the application or applet;
transmitting the identified functionality of the application or applet to a remote control;
defining a user interface on the remote control in response to the transmitted functionality.

25. A system comprising:
a computer having a processor for executing one or more applications or applets, and having a display for displaying information related to the one or more applications or applets;
a plurality of peripheral devices coupled to the computerized system;
a controller having a graphical user interface which includes at least one softkey responsive to the execution or activation of a first one of the applications or applets to provide a first control function and responsive to the execution or activation of a second one of the applications or applets to provide a second control function.

* * * * *